(12) United States Patent
Everett

(10) Patent No.: US 9,212,826 B2
(45) Date of Patent: Dec. 15, 2015

(54) METHOD AND APPARATUS FOR CLIMATIC CONDITIONING OF SPACE WITHIN A BUILDING STRUCTURE

(76) Inventor: Steve Eugene Everett, Evant, TX (US)

(*) Notice: Subject to any disclaimer, the term of this patent is extended or adjusted under 35 U.S.C. 154(b) by 672 days.

(21) Appl. No.: 13/563,363

(22) Filed: Jul. 31, 2012

(65) Prior Publication Data
US 2013/0055736 A1   Mar. 7, 2013

Related U.S. Application Data

(60) Provisional application No. 61/575,959, filed on Sep. 1, 2011, provisional application No. 61/631,218, filed on Dec. 30, 2011, provisional application No. 61/628,048, filed on Oct. 24, 2011.

(51) Int. Cl.

| | |
|---|---|
| F25D 17/06 | (2006.01) |
| F25D 17/04 | (2006.01) |
| F25B 49/00 | (2006.01) |
| E04D 13/18 | (2014.01) |
| E04H 14/00 | (2006.01) |
| F24F 3/14 | (2006.01) |
| F24F 11/00 | (2006.01) |
| G05D 22/02 | (2006.01) |
| F02M 23/14 | (2006.01) |
| F02M 31/00 | (2006.01) |
| F24F 5/00 | (2006.01) |
| F28D 20/00 | (2006.01) |

(52) U.S. Cl.
CPC .............. *F24F 5/0021* (2013.01); *F24F 3/14* (2013.01); *F28D 20/003* (2013.01); *Y02E 60/147* (2013.01)

(58) Field of Classification Search
CPC ... F24F 3/1417; F24F 5/0021; F24F 11/0012; F24F 2221/17; F24F 3/14; Y02E 10/44; E04B 1/0023; E04B 1/806; Y10S 261/65; Y10S 261/03; Y02B 30/545; F24D 11/007
USPC .............. 62/92; 52/173.1; 261/154; 236/44 C
See application file for complete search history.

(56) References Cited

U.S. PATENT DOCUMENTS

| | | | | |
|---|---|---|---|---|
| 3,450,192 A | * | 6/1969 | Hay | 165/49 |
| 3,702,156 A | | 11/1972 | Rohrs | |
| 4,093,435 A | | 6/1978 | Marron | |
| 4,161,852 A | * | 7/1979 | Schultz | 52/250 |
| 4,265,300 A | * | 5/1981 | Kurimoto | 165/47 |
| 4,404,959 A | * | 9/1983 | Mondragon | 126/632 |

(Continued)

*Primary Examiner* — Allen Flanigan
*Assistant Examiner* — Filip Zec
(74) *Attorney, Agent, or Firm* — David O. Simmons

(57) ABSTRACT

A method and apparatus are configured for providing thermal comfort (i.e., climatic conditioning) within an interior space of a building structure in multiple climate zones including hot and humid climates using very low energy consumption. Multiple water vapor phase change cycles are provided within a period of time where only a single such water vapor phase change cycle would typically take place under naturally occurring ambient conditions. These multiple water vapor phase change cycles are generated through artificially creating conditions within a hygroscopic heat sink mass for promoting water vapor phase change cycle. Advantageously, in combination with such artificially promoted water vapor phase change cycles, embodiments of the present invention provide hygroscopic properties and heat sink masses made from materials that can adsorb and retain thermal energy and that exhibit water vapor sorption/desorption attributes commonly associated with compositions referred to as desiccants.

19 Claims, 3 Drawing Sheets

(56) References Cited

U.S. PATENT DOCUMENTS

| | | | |
|---|---|---|---|
| 4,527,247 A * | 7/1985 | Kaiser et al. | 700/278 |
| 5,542,968 A | 8/1996 | Belding | |
| 6,293,120 B1 * | 9/2001 | Hashimoto | 62/260 |
| 7,568,321 B2 * | 8/2009 | Morey et al. | 52/747.1 |
| 8,047,905 B2 * | 11/2011 | Everett et al. | 454/187 |
| 8,371,073 B2 * | 2/2013 | Fuller | 52/80.1 |
| 2008/0184650 A1 * | 8/2008 | Fischer | 52/606 |
| 2009/0183853 A1 * | 7/2009 | Chen | 165/48.2 |
| 2012/0273171 A1 * | 11/2012 | Upadhya | 165/121 |

* cited by examiner

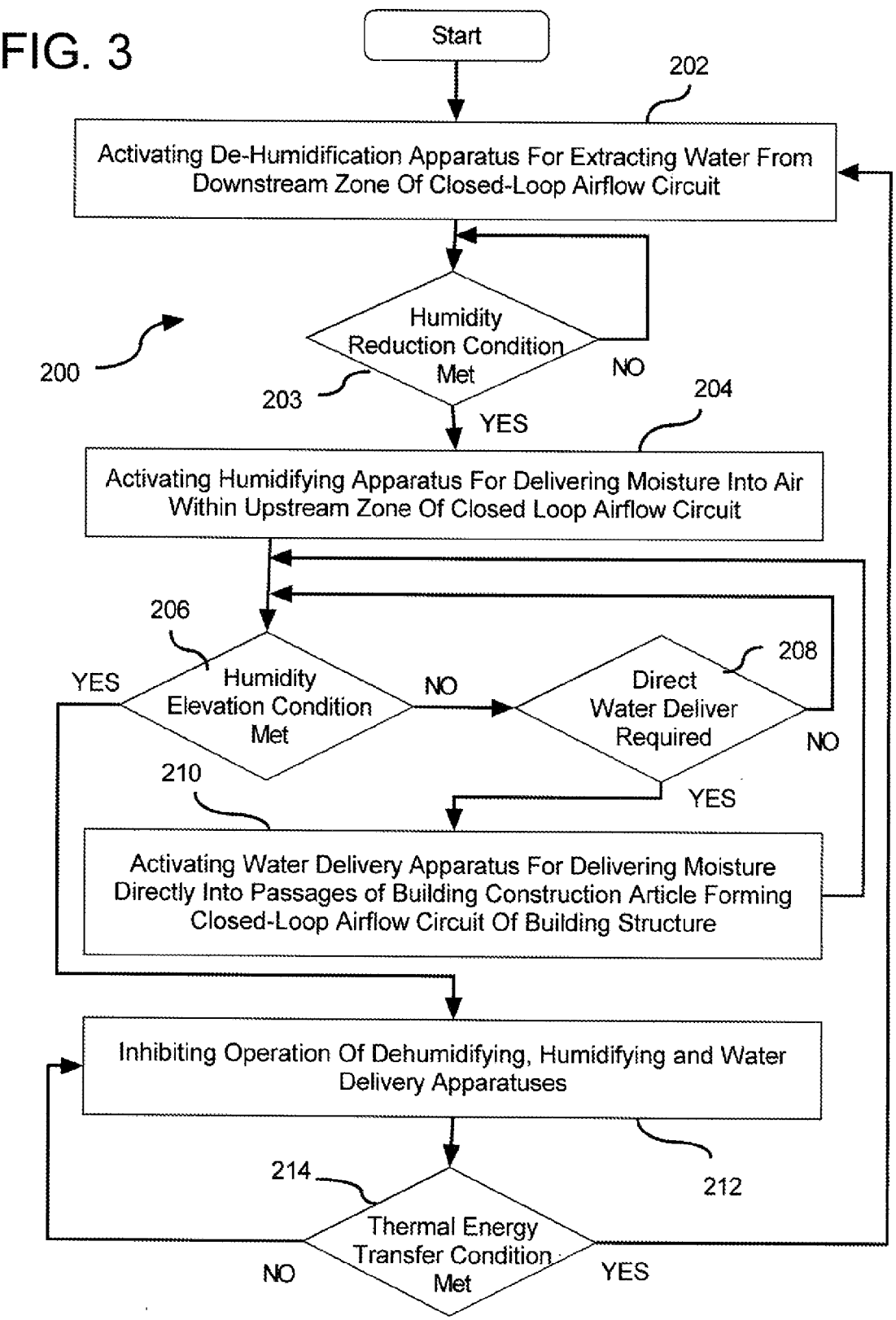

METHOD AND APPARATUS FOR CLIMATIC CONDITIONING OF SPACE WITHIN A BUILDING STRUCTURE

CROSS REFERENCE TO RELATED APPLICATIONS

This patent application claims priority from the following U.S. Provisional Patent Applications all having a common applicant herewith and being incorporated herein in their entirety by reference: Ser. No. 61/575,959, filed Sep. 1, 2011, entitled "Method And Apparatus For Climatic Conditioning Of A Building Structure"; Ser. No. 61/628,048, filed Oct. 24, 2011, entitled "Method And Apparatus For Climatic Conditioning Of A Heat Sink Mass Of A Building Structure"; and Ser. No. 61/631,218, filed Dec. 30, 2011, entitled "Method And Apparatus For Climatic Conditioning Of A Building Structure".

FIELD OF THE DISCLOSURE

The disclosures made herein relate generally to approaches for providing climatic conditioning of a building structure and, more particularly, to utilizing a controlled moisture differential in combination with building structure materials having desiccant-like properties to provide for climatic conditioning of a space within a building structure.

BACKGROUND

It is well known that fusion type phase change materials are capable of storage and release of large amounts of thermal energy. While fusion type phase change materials change phase from a solid to a liquid, they are limited in the amount of thermal energy they can store and release. Water, which has the capability to change from a liquid to a vapor and then from a vapor to a liquid (i.e., referred to herein as a water vapor phase change cycle), is a much more effective phase change material surpassing the heat accumulation and heat releasing capacity of fusion type phase change materials many times over. In this regard, water has exceptional thermal energy storage and thermal energy transferring properties when changing phases from a liquid to a vapor and then from a vapor to a liquid. Water used as a phase change material is therefore very useful for the thermal energy conditioning of a heat sink mass of a building structure when a method and apparatus configured for controlling the phase change of water within a heat sink mass defining an interior space or interior space partitions of a building structure is configured for climatically conditioning of the heat sink mass and for displacing thermal energy (i.e., heat) from the heat sink mass to a space outside of the interior space of the building structure.

Traditionally evaporative cooling systems have been used with great success and with very low energy consumption in climate zones that are hot and dry. However, in climate zones that are hot and humid, evaporative cooling and indirect evaporative cooling systems have had only limited success with respect to compressed gas cooling systems. Desiccant air drying in combination with evaporative cooling have also been tried with some success, but require large systems to condition the total cubic area within a living space of a building structure. Similarly, previous approaches for providing acceptable comfort levels within a living space of a building structure utilizing water evaporation systems in hot humid climate zones have been marginally successful primarily because the focus of such previous approaches has been the conditioning of the air within the living space of the building structure. In this regard, such known climatic control systems have not been successful at providing thermal comfort in a building structure in hot and humid climates in a manner that utilizes low energy consumption.

Some other previous approaches for providing a thermal comfort range for humans within a living space of a building structure rely on a method of thermal conditioning of a heat sink mass of a building structure (e.g., walls and/or floors thereof). Such thermal conditioning of the heat sink mass is typically performed by circulating cooling or heating fluids through piping imbedded within the heat sink mass, thereby either circulating heated fluid through piping in the heat sink mass and then outwardly radiating heat to the occupants within the living space or by circulating cooled fluid through piping in the heat sink mass. In the case of circulating the cooled fluid, heat transferred into the fluid from the living space is then displaced to a space outside of the building structure generally through a forced air heat exchanger, thereby removing heat from the heat sink mass. Transferring thermal energy through a water circulating system within a heat sink mass of a building structure for heating and cooling is very efficient, but is not very cost effective in that the cost of the additional materials such a piping, pumps and heat exchangers for cooling and heating fluids increase costs of heating and cooling the building structure.

Two forms of heat are relevant in air conditioning: sensible heat and latent heat. When an object is heated, its temperature rises as heat is added. The increase in heat is called sensible heat. Similarly, when heat is removed from an object and its temperature falls, the heat removed is also called sensible heat. Heat that causes a change in temperature in an object is called sensible heat. All pure substances in nature are able to change their state. Solids can become liquids (ice to water) and liquids can become gases (water to vapor) but changes such as these require the addition or removal of heat. The heat that causes these changes is called latent heat. Latent heat is thermal energy released or adsorbed during a phase-change of a chemical substance such as water; latent heat of vaporization/condensation ($Lv$) is the energy released or adsorbed in a phase-change from a liquid to vapor or vapor to a liquid. The reaction is exothermic or endothermic depending on the direction of the phase change Latent heat of vaporization is the quantative thermal energy required to change water from a liquid phase to a vapor phase without changing the temperature of the substance for example, water remains at 100° C. while boiling. The additional heat added while boiling the water is transferred into the phase change of vaporizing water. For this reason the temperature of the boiling water stays at a constant temperature although additional heat is being added to the boiling water. Heat of condensation is exothermic therefore the thermal energy released from the vaporized water at the phase change of the water vapor to liquid water is released to the surrounding environment. The quantative thermal energy transferred during the phase change of water from a liquid to a vapor and from a vapor to a liquid is equal. The transfer of this thermal energy from phase to phase is at least one of a preferred means of transferring thermal energy to and from the heat sink mass of the present discloser. In the present discloser cycled vapor pressure differentials at ambient temperatures promote the change of phase of water. When water in a liquid phase within the heat sink mass of the building structure is caused to evaporate from the heat sink mass of the building structure to the lower pressure of a circulating dry air stream, the sensible temperature of the heat sink mass is reduced to a lower sensible temperature. In the present discloser the quantitive thermal energy required for the vaporization of the liquid water is transferred out of the heat sink mass of the building structure and the liquid water mass within the heat sink mass to the vaporizing water and thereby conditions the heat sink mass to a lower sensible temperature, this thermal energy is carried away within the air of the closed loop circulating air stream and then out to a space outside of the building structure. Appreciating these properties of the phase change of water from a liquid to a vapor and then from a vapor to a liquid is fundamental to understanding at least one of the preferred means by which thermal energy is transferred into/out of the heat sink mass of the building structure of this present discloser.

Adobe building materials (e.g., blocks) and similarly types of building materials (e.g., compressed earth blocks, rammed earth, cob) are well known for their capacity to provide thermal comfort for the occupants within a living space of a building structure made therefrom. These types of building materials, which function as heat sink masses and a hygroscopic phase change media, typically comprise a mixture of sand, gravel, agricultural plant fiber and clay and, if desired, material binders. Adobe building materials and the like also comprise porous compositions such as clay and a wide range of open pore structure sizes formed between particles of the combined compositions. The clay composition comprises a negative electrostatic attraction (referred to as cation exchange capacity) to the positive ions of water. Adobe and other similar materials can therefore be considered as a building material that has elevated hygroscopic properties. In this regard, these types of building materials form a composite material that is capable of accumulating and transferring sensible and latent heat, through the transmission of water vapor, within/through the heat sink mass of the building structure and within the water mass condensed therein. The heat sink mass of the building structure comprise sufficient mass for supporting thermal energy for extended periods of time and thereby extending periods of time between activation of the cycled conditioned air streams.

Adobe building materials, which are a type of heat sink mass (i.e., adobe heat sink mass), provide a composition that supports phase change of liquid water to water vapor and from water vapor to liquid water into/out of a heat sink mass made from such building materials. For example, negatively charged clay particles within an adobe heat sink mass attract water vapor (being bipolar) through an electrostatic attraction from the surrounding environment comprising high humid conditions typically in night-time and early morning hours when cooler temperatures are present. As ambient air is cooled during the night and early morning hours, humidity increases and water vapor within the surrounding air is diffused into the porous adobe heat sink mass through adsorption resulting from a water vapor pressure imbalance between the relatively dry adobe heat sink mass and the ambient climatic air conditions, thereby causing water vapor to be diffused into the relatively dry, negatively charged clay particles of the adobe heat sink mass, forming an electrostatic attraction between the clay particles of the adobe heat sink mass and the positive ions of water and, thus, water vapor is changed to a liquid within the clay particles and porous structures of the adobe heat sink mass. The resulting phase change is exothermic and therefore thermal energy is released to the surrounding environment. During the less humid warm daytime hours a vapor pressure differential is formed between the condensed liquid water contained within the adobe heat sink mass and the dry daytime air, liquid water within the adobe heat sink mass receives thermal energy through solar radiation and other radiation sources and is changed back to a vapor through a process of evaporation, thereby vaporizing the liquid water mass within the adobe heat sink mass and begins diffusing water vapor out of the porous structures of the adobe heat sink mass to the surrounding environment along with the associated thermal energy accumulated within the adobe heat sink mass and the condensed liquid water mass within the adobe heat sink mass thus, lowering the sensible heat of the adobe heat sink mass through evaporative cooling, providing a cooling effect of nearly 1.000 BTUs of thermal energy removed from the heat sink mass and the liquid water mass within the adobe heat sink mass for every pound of water evaporated. Therefore, compositions of adobe heat sink mass in combination with natural climatic changes between cool moist night air and hot dry day time air provide the combined conditions for changing phases of water from a vapor to a liquid and from a liquid to a vapor within the adobe heat sink mass, thereby naturally and passively providing thermal conditioning of the adobe heat sink mass of a building structure. In this regard, adobe building structures are known to be warm during the cool of night and cool in the heat of day While this climatic conditioning of a living space within a building structure made using adobe heat sink masses using the natural method of heating and cooling a building structure works very well, it has limitations based on the limited natural cycles of cool, humid evenings and warm dry days. The limiting factor in the effectiveness of this climatic conditioning is the limited number of thermal conditioning cycles transpiring in a given time frame (e.g., typically one cycle per day).

Therefore, an approach for providing thermal comfort (i.e., climatic conditioning) within an interior space of a building structure in multiple climate zones including hot and humid climates using very low energy consumption and overcoming limitations associated with naturally occurring limited number of thermal conditioning cycles transpiring over a day would be beneficial, desirable and useful.

SUMMARY OF THE DISCLOSURE

Embodiments of the present invention are directed to providing thermal comfort (i.e., climatic conditioning) within an interior space of a building structure in multiple climate zones including hot and humid climates using very low energy consumption and overcoming limitations associated with naturally occurring number of thermal conditioning cycles transpiring over a given period of time (e.g., over the duration of a single day). More specifically, embodiments of the present invention provide for multiple water vapor phase change cycles within a period of time (e.g., over the duration of a single day) where only a single such water vapor phase change cycle would typically take place under naturally occurring ambient conditions (e.g., over the duration of a single day). These multiple water vapor phase change cycles are generated through artificially creating climatic conditions within a heat sink mass having hygroscopic properties for promoting water vapor phase change cycles and the transfer of thermal energy into/out of the heat sink mass. The heat sink mass comprises a mass size to support thermal energy for extended periods of time and thereby extending the periods of time between activation of cycled conditioned air streams. Furthermore the periods of time between activation of cycled conditioned air streams can be extended by the incorporation of fusion type phase change materials within said building construction articles, thereby increasing the thermal mass of said building construction articles and the efficient effectual working of said climatic conditioning system. Advantageously, in combination with such artificially promoted water vapor phase change cycles, embodiments of the present invention provide hygroscopic properties and heat sink masses made from materials that can adsorb and retain thermal energy for extended periods of time and that exhibit water vapor sorption/desorption attributes commonly associated with hygroscopic compositions referred to as desiccants. While virtually all materials exhibit desiccant type behavior, the term desiccant associated with the hygroscopic properties of the building construction articles of this present discloser is reserved for materials for which this behavior can be utilized to produce a predictable and useful results, such as the transfer of thermal energy to and from said building construction articles. Building construction articles of this present discloser are highly porous providing a high rate of vapor permeability and elevated hygroscopic properties. These properties in combination with artificially promoted water vapor phase change cycles are crucial to the efficient effectual transfer of water vapor and associated thermal energy and thereby the climatic conditioning of the building structure. Building construction articles with elevated hygroscopic properties and high vapor permeable properties are provided by imparting multiple characteristics to the building construction articles that facilitate and promote low resistance to water vapor permeability and hygroscopicity of the building construction articles. The vapor permeability and rate of hygroscopicity of the building construction articles of this present discloser can be demonstrated by the quantity of water adsorbed into 1 square meter in a given amount of time. The building construction articles of the present discloser are capable of providing a rate of hygroscopicity from moderate to very fast. Each one of the building construction articles comprises a rate of hygroscopicity demonstrated by an adsorbed quantity of water vapor in a 12 hour period of from about 45 grams to about 400 grams per square meter of surface area and is facilitated by providing the building construction articles with preferred physical properties of porosity from from 10 to 120 US Perms, preferred densities from about 15 to about 120 pounds per cubic foot and still more preferred from about 15 to about 75 pounds per cubic foot, preferred CEC capacity (cation exchange capacity) is from about 10 to about 120 megs, a preferred equilibrium moisture content at about 68 degrees Fahrenheit and about 50% relative humidity of about 3% to about 11% and an equilibrium moisture content at about 68 degrees Fahrenheit and about 85% relative humidity from about 6% to about 22%, demonstrated by a water vapor adsorption isotherm type of at least one of a Type III, Type IV, Type V adsorption isotherm.

In one embodiment of the present invention, a climatic conditioning system comprises a plurality of hygroscopic heat sink mass building construction articles, an airflow imparting apparatus, a humidifying apparatus, a dehumidifying apparatus, heat transfer controller and sensible air heating and cooling devices. The plurality of hygroscopic building construction articles is configured to form a portion of a building structure. Each one of the building construction articles is formulated and made to demonstrate hygroscopic and heat sink mass properties and an elevated rate of vapor permeability, demonstrated by a predetermined value of electrostatic attraction to the positive ions of water (CEC), predetermined properties of porosity determined by a wide range of pore sizes and distributions thereof, effecting thereby vapor permeability, predetermined properties of mass densities of the building construction articles having porous material compositions and intraparticle open pore structure formations of the building construction articles, a predetermined equilibrium moisture content having a preferred adsorption isotherm type and a design/shape of the building construction articles to provide increased surface area exposure to the circulating air streams, for the purpose of promoting an elevated rate of vapor permeability, water vapor adsorption/desorption capacities and thereby elevated hygroscopic properties, providing thereby building construction articles of the present discloser providing the efficient diffusion of water vapor, condensation of water vapor, transfer of liquid water through capillary suction and the evaporation of water into/out of the building construction articles. In this regard the preferred embodiments of the building construction articles of the present discloser have a low resistance to moisture transmission and have hygroscopic and heat sink mass properties. The efficiency and the effectual working of the conditioning system depends upon and is crucial to having the aforementioned predetermined properties of the building construction articles of this present discloser and the capacity of the conditioning system to provide a continuous selectively controlled volume of air having pronounced vapor pressure differentials between the building construction articles and the pronounced vapor pressures of the circulating air streams. Furthermore in certain extreme climate zones such as hot and cold climate zones, the incorporation of fusion type phase change materials within said building construction articles and/or the addition of thermal retarders (such as Styrofoam) and vapor barriers to the ambient side building structure surface can add to the efficiency of the climatic conditioning system by buffering extreme temperature changes and limiting uncontrolled ambient water vapor intrusion. The conditioning system and the air conditioning devices and apparatuses of this present discloser are capable of providing relative humidity ranges from about 2% to about 100% at ambient air temperatures from about 45 degrees Fahrenheit to about 130 degrees Fahrenheit and thereby can provide the pronounced vapor pressure differentials. The building construction articles are arranged relative to each other to form an airflow passage extending through the portion of the building structure. A surface of each one of the building construction articles defines a respective portion of the airflow passage. The airflow imparting apparatus has an airflow passage thereof coupled to the airflow passage formed by the building construction articles such that the airflow passages jointly define a closed-loop airflow circuit. The airflow imparting apparatus provides for a selectively controlled velocity of thermally conditioned, moisture conditioned forced airflow through the closed-loop airflow circuit providing thereby a continuous exposure of the building construction articles to a continuous air stream of pronounced vapor pressure differences and thereby promoting an elevated rate of water evaporation and condensation of water vapor. The humidifying apparatus is coupled to the airflow imparting apparatus and enables a humidity level of the forced airflow to be selectively increased. The dehumidifying apparatus is coupled to the closed-loop airflow circuit and enables the humidity level of the forced airflow to be selectively decreased. The heat transfer controller is coupled to the airflow imparting apparatus, the humidifying apparatus, and the dehumidifying apparatus. The heat transfer controller controls operation of the airflow imparting apparatus, the humidifying apparatus, and the dehumidifying apparatus for concurrently causing the apparatuses to provide for humidity reduction of air of the forced airflow at a position between an airflow exit of the airflow passage formed by the building construction articles and the humidifying apparatus and for alternating vapor pressure imbalances between the air of the forced airflow and the building construction articles thereby promoting phase change and movement of water into and out of the building construction articles to at least one of dissipate thermal energy therefrom and provide thermal energy thereto. Furthermore the aforementioned climatic air conditioning devices and apparatuses of the present discloser can be configured in a multiplicity of design configurations and can include both liquid and dry desiccant dehumidifying systems, silica gel/zeolite adsorption chillers, air/water evaporative cooled chillers, absorption chillers, solar air conditioning systems incorporating adsorption, absorption chillers, compressed gas air dehumidifying systems, flash evaporating systems, direct evaporative cooling systems, indirect evaporative cooling systems, compressed gas air conditioning devices, water fogging systems, water misting systems, heat pipe heat exchanger systems, water cooling towers, air cooling towers, air to air heat exchange devices, water to air heat exchanger devices, metered liquid injection devices, solar air heating systems, solar water heat exchanger systems, geothermal systems, air moving devices, air damping control valve devices, air filtering devices, air ducting devices, water chilling devices, ice making devices and heat pumps.

In another embodiment of the present invention, a method for providing climatic conditioning of a building structure comprises a plurality of operations. An operation is performed for circulating air through a closed-loop airflow circuit of a building structure. A first portion of the closed-loop airflow circuit is formed by a plurality of hygroscopic heat sink mass building construction articles arranged relative to each other to form an airflow passage extending therethrough. A second portion of the closed-loop airflow circuit is formed by an airflow passage of an airflow imparting apparatus. The airflow imparting apparatus provides for a selectively controlled velocity of thermally conditioned, moisture conditioned forced airflow of said forced airflow through the closed-loop airflow circuit. An operation is performed for causing a humidity reduction of the air within a zone defined between an exit of the airflow passage formed by the building construction articles and the humidifying apparatus. Concurrently with causing the humidity reduction, an operation is performed for causing alternating vapor pressure imbalances between the air and the building construction articles thereby promoting phase change of water and movement of water into and out of the building construction articles to at least one of dissipate thermal energy therefrom and provide thermal energy thereto causing alternating vapor pressure imbalances includes causing a humidity level of the air within a zone defined between the humidifying apparatus and an inlet of the airflow passage formed by the building construction articles to be decreased until a defined humidity-reduction condition is met and then causing the humidity level of the air within the zone defined between the humidifying apparatus and the inlet of the airflow passage formed by the building construction articles to be increased until a humidity-elevation condition is met.

In one embodiment of the present invention, the hygroscopic properties are demonstrated by an equilibrium moisture content at about 68 degrees Fahrenheit and about 50% relative humidity from about 3% to about 11% and an equilibrium moisture content at about 68 degrees Fahrenheit and about 85% relative humidity from about 6% to about 23%, demonstrated by a water vapor adsorption isotherm type of at least one of a Type III, Type IV, Type V adsorption isotherm. In this regard, hygroscopic properties of this present discloser are considered to be elevated hygroscopic properties. To this end, building construction articles configured in accordance with an embodiment of the present invention have specific functions in regards to the efficient working of a climatic conditioning system of the present invention. The intended function of these building construction articles is to promote a level of hygroscopic properties and a rate of hygroscopicity that facilitates the movement of water vapor, provide storage capacity of condensed water and facilitates the transfer of water into and out of these construction articles in a relatively short period of time. The properties of said construction articles provide hygroscopic and heat sink mass functionality including facilitated diffusion of water vapor into and out of these articles, the condensation of water vapor into a liquid within these articles, the movement of liquid water into these article by capillary suction, the evaporation of condensed water from these articles, the water vapor uptake capacity, the rate of adsorption, the rate of evaporation and the storage of thermal energy, said functionality of said construction articles are provided by building construction articles that are made to promote and provide said properties for the efficient effectual working of the climatic conditioning system as a whole. The physical attributes of these articles that promote the level of desired hygroscopic functionality include porous structures, permeability, cation exchange capacity, rate of water vapor uptake in a specific time frame at a specified humidity level and temperature.

These and other objects, embodiments, advantages and/or distinctions of the present invention will become readily apparent upon further review of the following specification, associated drawings and appended claims.

BRIEF DESCRIPTION OF THE DRAWINGS

FIG. 3 is a flow chart showing a method for providing climatic conditioning in accordance with an embodiment of the present invention.

DETAILED DESCRIPTION

Figure 1:
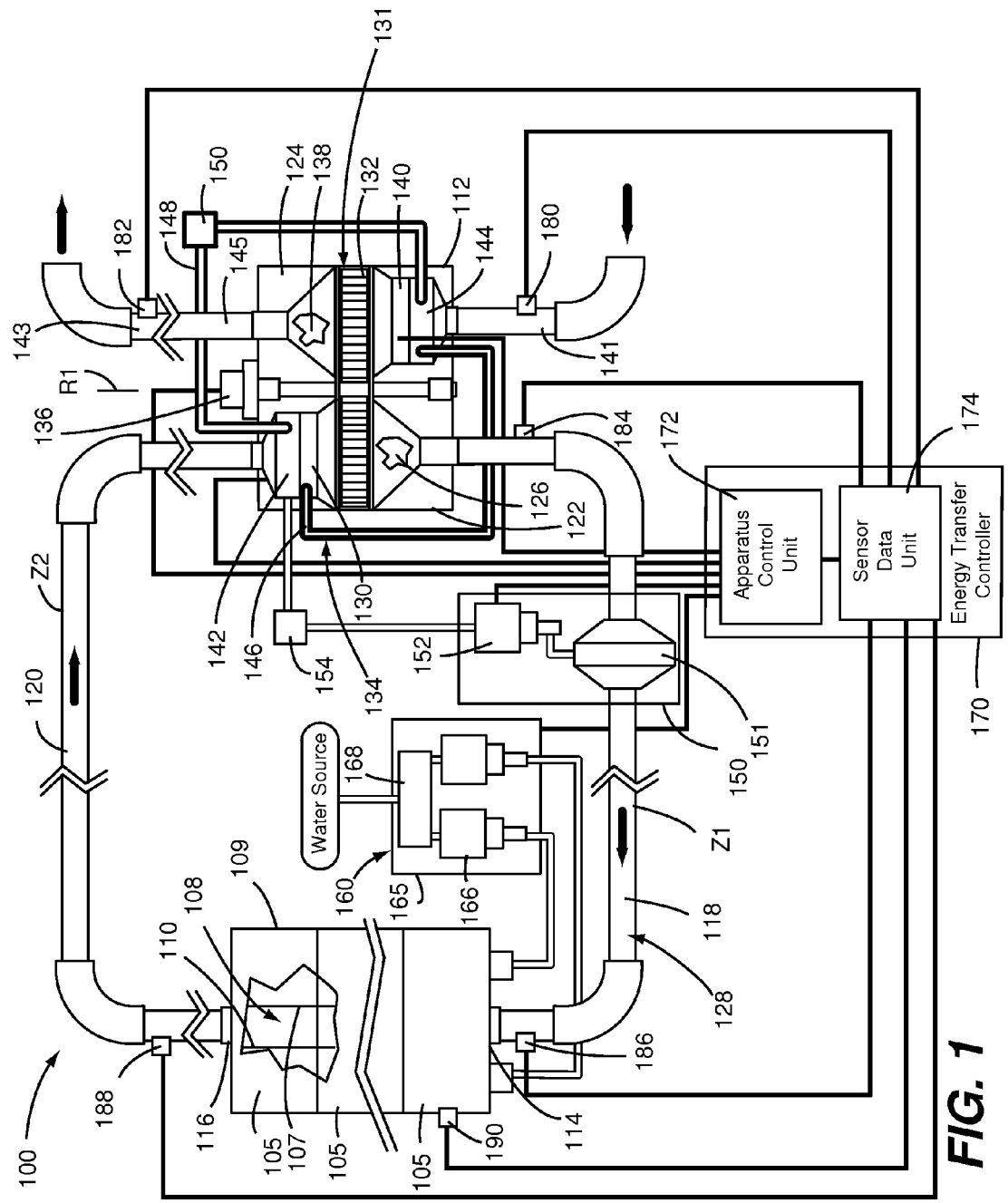
FIG. 1 is a diagrammatic view showing a building structure climatic conditioning system configured in accordance with an embodiment of the present invention.

Embodiments of the present invention provide a means for climatically conditioning the hygroscopic heat sink mass of the building construction articles and the cavities within the heat sink mass of the building structure to a moist condition and then to very dry climatic condition. A primary object of such embodiments is the climatic conditioning (sensible and latent) of the permanent heat sink mass of the building structure (e.g., building construction articles thereof) and more specifically a method and apparatus for the conditioning of the hygroscopic permanent heat sink mass. The heat sink mass comprises building construction articles having hygroscopic properties and a heat sink mass size to support thermal energy for extended periods of time and thereby extending the periods of time between activation of the cycled conditioned air streams. Furthermore the periods of time between activation of cycled conditioned air streams can be extended by the incorporation of fusion type phase change materials within said building construction articles, thereby increasing the thermal mass of said building construction articles and the efficient effectual working of said climatic conditioning system, which is an integrally incorporated part of the climatic conditioning, air circulating closed loop system. Climatic conditioning of the permanent heat sink mass is accomplished through circulating a first thermally conditioned, relatively moist climatically conditioned air stream and then a second thermally conditioned, relatively dry climatically conditioned air stream through air passage paths within a permanent vapor permeable heat sink mass of the building structure comprising water vapor hygroscopic properties for the purpose of climatically conditioning of the heat sink mass of the building structure to at least one of a cooler and a warmer sensible temperature. Furthermore in certain extreme climate zones such as hot and cold climate zones, the addition of thermal retarders (such as Styrofoam) and vapor barriers to the ambient side building structure surface can be beneficial to the efficient effectual working of the climatic conditioning system by buffering extreme temperature changes and limiting uncontrolled water vapor intrusion through the ambient side building structure surface. When a first climatically conditioned air stream comprising water vapor therein is exposed to the previously thermally conditioned and relatively dry conditioned properties of the vapor permeable heat sink mass, comprising hygroscopic properties exposed within the air passage paths of the vapor permeable heat sink mass, water vapor of the circulating air stream is diffused through the vapor permeable heat sink mass into the hygroscopic material compositions and porous structures of the heat sink mass and is therein changed to a liquid. Water vapor when changed to a liquid within the heat sink mass releases thermal energy to the surrounding environment through heat of condensation and the transient liquid water mass is transferred through capillary suction therein, said transient liquid water mass is thereby increased in thermal energy through conduction and radiation. Therefore, as water vapor is changed to a liquid within the hygroscopic water vapor sorption/desorption materials and porous structures of the vapor permeable hygroscopic heat sink mass, liquid water mass is transferred through capillary suction and therein radiant thermal energy stored within the heat sink mass is transferred through conduction and radiation into the transient liquid water mass, being in intimate contact with the liquid water held within the hygroscopic sorption/desorption properties and porous structures of the heat sink mass. It is disclosed herein that climatic conditioning referenced within this discloser refers to at least one of sensible heat and latent heat conditioning.

As the heat sink mass increases in thermal energy through solar radiation and other thermal radiation sources, the thermal energy is transferred through conduction and radiation into the liquid transient water mass and is accumulated therein, until a predetermined time or a predetermined sensible temperature is reached. At such a time a second conditioned air stream comprising a relatively low water vapor humidity and optionally conditioned to one of a lower sensible temperature a higher sensible temperature is circulated through the air circulating closed loop system comprising in part air passage paths of the vapor permeable hygroscopic heat sink mass, exposing the transient liquid water mass held within the sorption/desorption materials and porous structures of the heat sink mass, to the second relatively dry conditioned and sensibly conditioned air stream, thereby causing a vapor pressure imbalance there between, within the air passage paths of the vapor permeable heat sink mass, and thereby causing the transient liquid water mass accumulated with thermal energy transferred from the permanent heat sink mass and the radiation sources, to begin vaporizing, diffusing the transient water vapor mass through the vapor permeable heat sink mass into the relatively dry circulating air stream, thereby causing a change of phase from a liquid to a vapor and thereby transferring thermal energy from the permanent heat sink mass and the liquid water mass, into the vaporizing water mass being diffused into the second climatically conditioned relatively dry air stream. Furthermore it is disclosed here in that vapor pressure differentials can be increased or decreased by at least one of increasing atmospheric pressure or decreasing atmospheric pressure within air passages of the heat sink mass for the purpose of augmenting the diffusion of water vapor into/out of the heat sink mass The second air stream is continuously being dehumidified as the moisture is being diffused from the building structure into said second air stream of the air circulating closed loop system and thereby climatically conditions the heat sink mass to a sensibly cooler and drier condition. The vaporized water mass diffused to the second relatively dry air stream is transferred to a space outside of the air circulating closed loop system through devices for continuously removing moisture and associated thermal energy from the air circulating closed loop system, and for simultaneously reconditioning the second relatively dry air stream to a previous dry condition for facilitating a continuous vapor pressure imbalance between the second circulating air stream and the relatively water infused heat sink mass, causing thereby continuous vaporization of the liquid water from the sorption/desorption properties and porous structures of the hygroscopic heat sink mass, until a predetermined sensibly cooled relatively dry condition of the heat sink mass of the building structure has been achieved, thereby completing a cycle of climatically conditioning the heat sink mass of the building structure, transforming the building structure comprising a flooring support structure, wall structure, roof structure into a relatively dry heat sink mass with a lower sensible heat, capable of receiving from or delivering radiating thermal energy and latent thermal energy from/to the objects and occupants within the living space of the building structure.

FIG. 1 shows a building structure climatic conditioning system 100 configured in accordance with an embodiment of the present invention. The building structure climatic conditioning system 100 is configured for providing thermal comfort (i.e., climatic conditioning) within an interior space of a building structure in multiple climate zones including hot and humid climates using very low energy consumption and overcoming limitations associated with naturally occurring limited number of thermal conditioning cycles transpiring over a given period of time (e.g., over the duration of a single day). Advantageously, the building structure climatic conditioning system 100 provides for multiple water vapor phase change cycles within a period of time (e.g., over the duration of a single day) where only a single such water vapor phase change cycle would typically take place under naturally occurring ambient conditions (e.g., over the duration of a single day). These multiple water vapor phase change cycles are generated through artificially creating conditions within a hygroscopic heat sink mass for promoting water vapor phase change cycles. A home or other space intended to be occupied by people or goods that are sensitive to elevated temperatures and elevated relative humidity is an example of such a building structure in which a building structure climatic conditioning system configured in accordance with an embodiment of the present invention can be implemented.

The building structure climatic conditioning system 100 includes a plurality of building construction articles 105 that are arranged in a manner for forming a portion of a building structure. Furthermore, the building construction articles 105 are configure such that, when arranged to forming the portion of the building structure, form an airflow passage 108 extending therethrough. A surface of each one of the building construction articles 105 defines a respective portion of the airflow passage and have a design/shape for increased surface area exposure to air flow of the air flow passage 108 for increased water vapor uptake and water vapor evaporation capacities for the purpose of increasing the thermal energy transfer capacity to and from the building construction articles. For example, as shown in FIG. 1, each one of the building construction articles can include a central passage 110 or serpentine air flow passage (not shown) that are aligned to each other for forming the airflow passage 108. A wall, a floor, a roof and a ceiling are each examples of a portion of the building structure that can be constructed using the building construction articles.

As is discussed below in greater detail, each one of the building construction articles 105 provide hygroscopic properties. As shown in FIG. 1, a first surface 107 of each one of the building construction articles 105 is directly exposed to the selectively controlled volume of forced airflow within the airflow passage 108 formed by the building construction articles 105. The first surface 107 is defined by a portion of a respective one of the building construction articles 105. The portion of the respective one of the building construction articles defining the first surface 107 demonstrates the hygroscopic properties. A second surface 109 of each one of the building construction articles 105 is adjacent to a living space of the building structure (e.g., defines or supports an interior wall thereof, both sides of an interior partitioning walls etc. The portion of the respective one of the building construction articles 105 defining the second surface 109 demonstrates the hygroscopic properties. Preferably, but not necessarily, the first surface and the second surface 107, 109 are coupled to each other through a portion of the respective one of the building construction articles that demonstrates the hygroscopic properties.

A dehumidification unit 112 is coupled between an inlet 114 and an outlet 116 of the airflow passage 108 via an upstream air duct 118 and a downstream air duct 120. The dehumidification unit 112 includes a building structure side 122 and an ambient environment side 124. An airflow passage 126 extending through the building structure side 122 of the dehumidification unit 112 is coupled to the airflow passage 108 formed by the building construction articles 105 by the upstream air duct 118 and a downstream air duct 120, thereby jointly define a closed-loop airflow circuit 128. Specifically, the closed-loop airflow circuit 128 is a continuous airflow path extending through the upstream air duct 118, the building construction articles 105, the downstream air duct 120, and the building structure side 122 of the dehumidification unit 112. An airflow imparting apparatus on the building structure side 122 of the dehumidification unit 112 (e.g., the first airflow imparting apparatus 130) provides for forced airflow through the closed-loop airflow circuit 128. A fan, blower, or other suitable device for creating forced airflow within the closed-loop airflow circuit 128 are examples of the first airflow imparting apparatus 130. Furthermore, the first airflow imparting apparatus 130 can be configured/coupled to a devise for one of adding sensible heat, removing sensible heat from/to the air flowing therethrough, such devices can be selected from any number of well know devices for adding or removing sensible heat to the air flow such as but not limited to, compressed gas cooling devices, passive energy recovery devices, solar heating device, geothermal devices and the like.

The dehumidification unit 112 includes a dehumidifying apparatus 131 that is coupled between the building structure side 122 and the ambient environment side 124 of the dehumidification unit 112 for causing moisture from within airflow of the closed-loop airflow circuit 128 to be transferred to the ambient environment (e.g., environment surrounding the building structure). The dehumidifying apparatus 131 includes a dry desiccant wheel 132, or an optional liquid desiccant system (not shown) and a heat transfer mechanism 134. Jointly, the desiccant wheel 132, or an optional liquid desiccant system (not shown) and the heat transfer mechanism 134 enable heat-laden moisture from the building structure side 122 to be transferred to the ambient environment side 124. The heat transfer mechanism 134 enables heat from air on the building structure side 122 to be transferred to the ambient environment side 124. In this manner, as will be discussed in greater detail below, heat can be extracted from within the building structure and shed into the ambient environment surrounding the building structure.

The desiccant wheel 132 intersects the airflow passage 126 of the building structure side 122 of the dehumidification unit 112 and an airflow passage 138 of the ambient environment side 124 of the dehumidification unit 112. A motor 136 or other suitable device rotates the desiccant wheel 132 about a wheel rotation axis R1. A second airflow imparting apparatus 140 on the ambient environment side 124 of the dehumidification unit 112 provides for moisture removal from the closed loop airflow circuit 128 (e.g., the first airflow imparting apparatus 130) provides for forced airflow through the airflow passage 126 of the building structure side 122 of the dehumidification unit 112 and thus through the entire closed-loop airflow circuit 128. In this regard, the second airflow imparting apparatus 140 on the ambient environment side 124 of the dehumidification unit 112 in combination with inlet and outlet airflow ducts 141, 143 jointly form an ambient-loop airflow circuit 145 (i.e., airflow from the ambient environment, through the ambient environment side 124 of the dehumidification unit 112, and back to the ambient environment). A fan, blower, or other suitable device for creating forced airflow within the ambient-loop airflow circuit 145 are examples of the second airflow imparting apparatus 140. Furthermore, the second airflow imparting apparatus 140 can be configured to add heat to the air flowing there through by any number of well-known heat exchanger devices, heat delivery devices for the regeneration of the desiccant wheel 132 removing the moisture from desiccant of the desiccant wheel 132 to a space outside of the building construction articles 105 including but not limited to solar air heating devices, solar water heat exchanger devices, gas air/water heat exchanger devices, electric air/water heating devices, passive heat recovery devices and configurations thereof.

The airflow passage 126 of the building construction side 122 of the dehumidification unit 112 and the airflow passage 138 of the ambient environment side 124 are located in an angularly spaced apart arrangement with respect to the wheel rotation axis R1 and is physically separated from the building construction side 122 and the closed-loop airflow circuit 128 by a partitioning wall section extending perpendicular to the desiccant wheel (e.g., nominally 180 degrees apart from each other). As such, a given region of the desiccant wheel 132 is exposed to airflow within the airflow passage 126 of the building construction side 122 and then becomes exposed to sensibly heated airflow within the airflow passage 138 of the ambient environment side 124. Accordingly, the duration of time for each one of such exposures is a function of the rotational speed of the desiccant wheel 132. In this manner, the desiccant wheel 132 serves to extract moisture and heat therein (latent heat) from air within the closed-loop airflow circuit 128 and shed such moisture to the ambient environment by means of moisture transfer from air in the closed-loop airflow circuit 128 into desiccant material of the desiccant wheel 132 and then from the desiccant material of the desiccant wheel 132 into the preheated air of the forced airflow in the airflow passage 138 of the ambient environment side 124 of the dehumidification unit 112. It is disclosed herein that the shed moisture can be recycled and collected to be reused in the humidifying apparatus 150 when configured with a passive/mechanical heat recovery device or the like when having the evaporator portion heat exchanger 142 of the heat recovery device, positioned within the ambient air flow passage 138 and the condenser portion heat exchanger 144 positioned upstream of the desiccant wheel 132 within the airflow passage 138 of the ambient environment side 124 and downstream of a forced air flow air heating device, condensing thereby the shed water vapor from the desiccant wheel 132 and the condensed water is directed to a collection container to be reused in the humidifying apparatus 150.

Details of operation and construction of desiccant wheels and liquid desiccant systems are well known. For example, such details are disclosed in U.S. Pat. Nos. 3,702,156, 4,093,435, and 5,542,968. Accordingly, their underlying construction and underlying operation will not be further discussed herein. Furthermore, in view of the disclosures made herein, a skilled person will appreciate that other approaches for dehumidification/apparatuses for providing dehumidification can be used in place of or in combination with a desiccant wheel.

The heat transfer mechanism 134 includes a building construction side evaporator heat exchanger 142, an ambient side condenser heat exchanger 144, a first transfer tube 146, a second transfer tube 148, and a flow inducer 150. The heat transfer mechanism 134 is configured and constructed for transferring heat from air within the closed-loop airflow circuit 128 to air within the ambient-loop airflow circuit 145 for the purpose of extracting heat from such closed-loop airflow circuit air and utilizing the shedding of such heat to recharge the desiccant 131 of the desiccant wheel 132 to a dry condition and thereby removes moisture from the desiccant wheel 132 to ambient environment via air of the ambient-loop airflow circuit 145. To this end, a fluid flow circuit extends and is routed to the building construction side evaporator heat exchanger 142, the ambient side condenser heat exchanger 144, the first transfer tube 146, that second transfer tube 148, and the flow inducer 150. By means of a thermal temperature gradient between the building construction side evaporator heat exchanger 142 and the ambient side condenser heat exchanger 144, a fluid within the fluid flow circuit of the heat transfer mechanism 134 absorbs heat from air flowing over the building construction side evaporator heat exchanger 142 and then dissipates at least a portion of such heat into air flowing across the ambient side condenser heat exchanger 144. The flow inducer 150 can be a passive type flow inducer that is not externally powered/energized (e.g., a heat energized gas expansion/throttling valve arrangement, wicking/capillary action or gravity action within the fluid flow circuit and the like or can be an active type flow inducer that is externally powered (e.g., an externally powered compressor with gas expansion/throttling valve). Accordingly, embodiments of the present invention are not unnecessarily limited to a particular arrangement for the heat transfer mechanism 134 aside from providing the disclosed heat transfer functionality.

The building structure climatic conditioning system 100 includes a humidifying apparatus 150 that is coupled within the upstream air duct 118 for enabling airflow to jointly flow through an airflow passage of the humidifying apparatus 150 and the upstream air duct 118. In one embodiment, the humidifying apparatus 150 is configured for delivering water vapor (i.e., moisture) into air flowing through the upstream air duct 118 thereby causing the humidity level of the forced airflow within a humidification (i.e., upstream) zone Z1 zone to be selectively increased. For example, a delivery portion 151 of the humidifying apparatus 150 can include nozzles, a spray bar, water fogging device and/or the like for enabling water vapor to be injected into air flowing through the upstream air duct 118. Such water can be provided from any number or sources such as, for example, a condensation collection container of the building construction side evaporator heat exchanger 142 and/or an evaporator heat exchanger 142 of the ambient environment side 124 downstream of the desiccant wheel 132 within the airflow passage 138 and/or an external source (i.e., residential/commercial/industrial water supply). A humidification control device 152 (e.g., a solenoid controlled valve, pressure pump) of the humidifying apparatus 150 enables such water to be selectively delivered to and dispensed from the delivery portion 151 of the humidifying apparatus 150.

A first water conditioning apparatus 154 can be coupled to the humidifying apparatus 150 for enabling water delivered into the air flowing through the upstream air duct 118 to be thermally conditioned. For example, the water can be chilled or heated prior to or after introduction of the water into the air flowing through the upstream air duct 118. The water conditioning apparatus 154 can be integral with the humidifying apparatus 150, located in-line with a water supply conduit at a position between the humidifying apparatus 150 and a source of such water, or the like. It is also herein disclosed that the first water conditioning apparatus 154 can be coupled to the upstream air duct 118 downstream of or coupled to the delivery portion 151 of the humidifying apparatus 150 wherein the water delivered into the upstream air duct 118 through the delivery portion 151 of the humidifying apparatus 150 is either heated or cooled by the water conditioning apparatus 154 when water has been delivered to and passed through the heating/cooling elements/coils of the water conditioning apparatus 154.

The underlying intent of adding moisture to the air flowing through the upstream air duct 118 is to create a vapor pressure imbalance between the air flowing through the airflow passage 108 formed by the building construction articles 105 and the building construction articles 105. This vapor pressure imbalance is defined as a positive vapor pressure imbalance in that the air flowing through the airflow passage 108 formed by the building construction articles 105 has a significantly higher water vapor level and therefore a higher vapor pressure than do the relatively dry building construction articles 105 forming the airflow passage 108. Accordingly, as such moisture laden air (having a higher vapor pressure) of the closed-loop airflow circuit 128 flows through the airflow passage 108 formed by the relatively dry building construction articles 105, having a lower water vapor pressure, water from the air is therefore adsorbed by the building construction articles 105. A negative vapor pressure imbalance refers to air flowing through the airflow passage 108 formed by the building construction articles 105 having a significantly lower water vapor level (lower vapor pressure) than does the building construction articles 105 (having a relatively high moisture content) forming the airflow passage 108. Accordingly as such relatively dry air of the closed-loop airflow circuit 128 flows through the airflow passage 108 formed by the building construction articles 105, water from the building construction articles 105 is evaporated from the building construction articles 105 having a significantly higher water vapor level than does the relatively dry air flowing through the air flow passage 108, water is therefore evaporated from the building construction articles 105.

Figure 2:
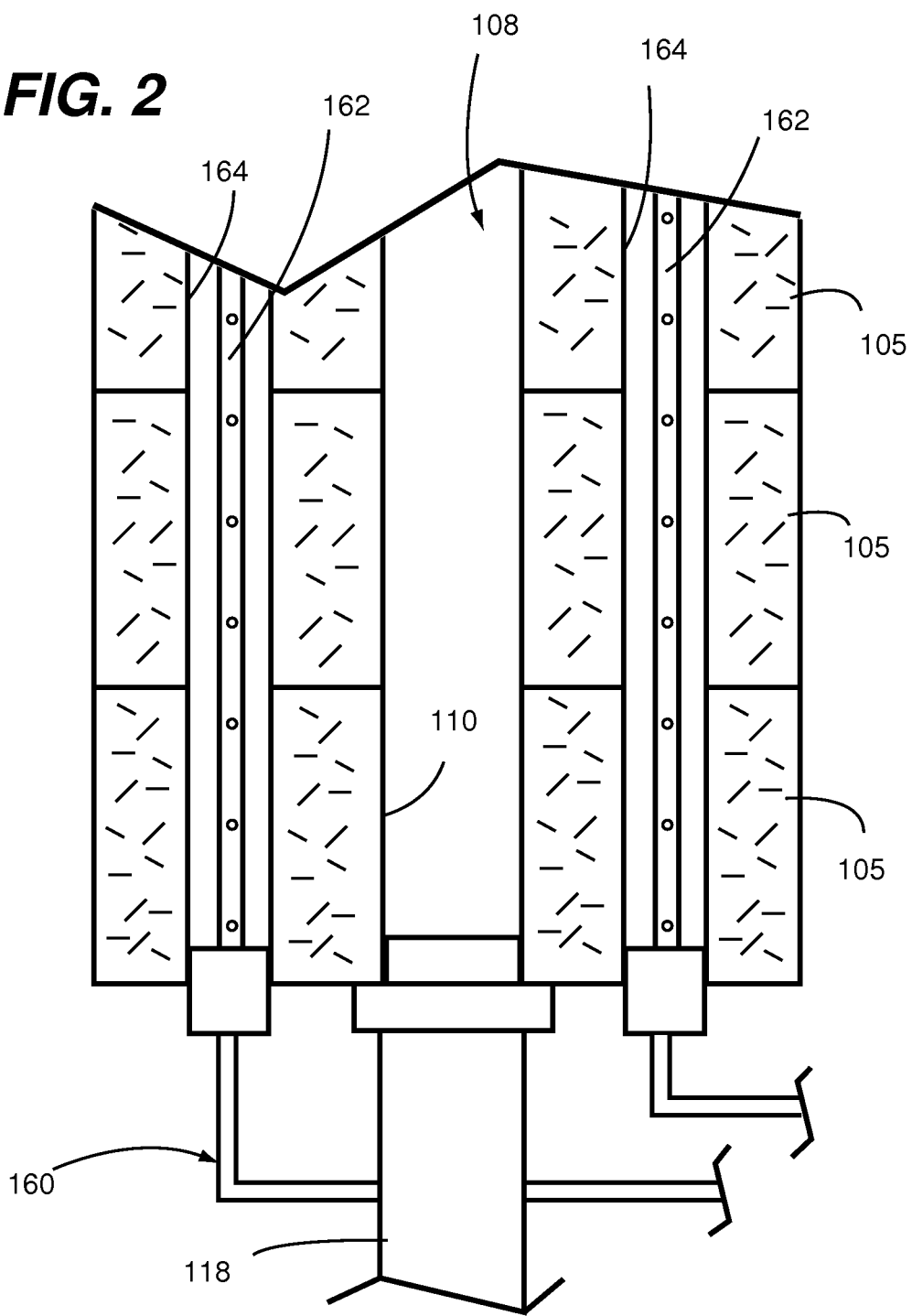
FIG. 2 is a partial fragmentary cross-sectional view showing a water delivery apparatus of the building structure climatic conditioning system shown in FIG. 1.

In some situations (e.g., a higher rate of moisture uptake by building construction articles 105 from air within the airflow passage 108 formed by the building construction articles 105), it is desirable and/or necessary to augment the moisture content provided by a vapor pressure imbalance between the air flowing through the airflow passage 108 formed by the building construction articles 105 and the building construction articles 105. To this end, as shown in FIGS. 1 and 2, the building structure climatic conditioning system 100 can include a water delivery apparatus 160 having one or more water outlet devices 162 (i.e., a water outlet portion of the water delivery apparatus 160) each located within a respective channel 164 of one or more of the building construction articles 105, as shown in FIG. 2. The water delivery apparatus 160 includes a delivery control unit 165 coupled between a water source and the one or more water outlet devices 162. The delivery control device 165 includes a humidification control device 166 (e.g., a solenoid controlled valve, pressure pump) that can be used for enabling water from a suitable water source to be selectively delivered to and dispensed from the one or more water outlet devices 162 into the respective channel 164. In this manner, moisture in excess of the amount capable of being delivered by the humidification apparatus 150 can be provided to the building construction articles 105. Furthermore, a water conditioning apparatus (e.g., the second water conditioning apparatus 168) can be coupled to or integral with the water delivery apparatus 160 for enabling water delivered by the water delivery apparatus 160 to be thermally conditioned. For example, the water can be chilled or heated prior to delivery of the water from the one or more water outlet devices 162.

As shown in FIG. 1, the building structure climatic conditioning system 100 includes an energy transfer controller 170. The energy transfer controller 170 includes an apparatus control unit 172 and a sensor data unit 174. As will be discussed below in greater detail, the apparatus control unit 172 manages operation of the various apparatuses, devices, and units of the building structure climatic conditioning system 100 and the sensor data unit 174 serves as a data interface between data sensors of the building structure climatic conditioning system 100 and the apparatus control unit 172. In this manner, the apparatus control unit 172 and the sensor data unit 174 jointly manage control and feedback signals that enable implementation of climatic control in accordance with the present invention.

The apparatus control unit 172 is coupled to the motor 136, the first airflow imparting apparatus 130, the second airflow imparting apparatus 140, the humidifying apparatus 150, the water conditioning apparatus 154, and the water delivery apparatus 160 (i.e., the apparatuses). The apparatus control unit 172 controls operation of such apparatuses for concurrently causing the apparatuses to provide for humidity reduction of air flowing through the building structure side 122 of the dehumidification unit 112 and to provide for alternating vapor pressure imbalances between the building construction articles and the air of the airflow passage 108 formed by the building construction articles. The alternating vapor pressure imbalances promote phase change and movement of water into and out of the building construction articles to dissipate thermal energy therefrom, to provide thermal energy thereto, or both. The humidity reduction of air flowing through the building structure side 122 of the dehumidification unit 112 serves to extract heat laden moisture and thus, thermal energy, from the air having passed through the airflow passage 108 formed by the building construction articles 105. In certain phases of the alternating vapor pressure imbalance operations, the humidity reduction of air flowing through the building structure side 122 of the dehumidification unit 112 also enhances the moisture uptake of air being humidified by the humidifying apparatus 150.

Providing alternating vapor pressure imbalances includes causing a humidity level of the forced airflow to be decreased until a defined humidity reduction condition is met and then causing the humidity level of the forced airflow to be increased until a defined humidity elevation condition is met. In a preferred embodiment, causing the humidity level of the forced airflow to be decreased includes operating the dehumidifying apparatus until the humidity-reduction condition is met and then simultaneously operating the dehumidifying apparatus and the humidifying apparatus until the humidity-elevation condition is met. The humidity-reduction condition can be met when at least one of the water content level of the forced airflow has been reduced by a defined amount, a temperature within at least one of the building construction articles has been reduced by a defined amount, a water content level of at least one of the building construction articles has been reduced by a defined amount, the dehumidifying apparatus has been in operation for a defined duration of time, and a defined high-level equilibrium moisture content of the building construction articles is achieved. The humidity-elevation condition can be met when at least one of the water content level of the forced airflow has been increased by a defined amount, a temperature within at least one of the building construction articles has been increased by a defined amount, a water content level of at least one of the building construction articles has been increased by a defined amount, the humidity-imparting apparatus has been in operation for a defined duration of time, a prescribed volume of water has been delivered into the forced airflow, and a defined low-level equilibrium moisture content of the building construction articles is achieved.

The motor 136 receives a control signal from the apparatus control unit 172, which can cause the motor 136 to turn on, turn off, operate a particular one of a plurality of different speeds, and/or the like. The first airflow imparting apparatus 130 receives a control signal from the apparatus control unit 172, which can cause the first airflow imparting apparatus 130 to turn on, turn off, operate a particular one of a plurality of different speeds, heat air flowing therethrough, and/or the like. The second airflow imparting apparatus 140 receives a control signal from the apparatus control unit 172, which can cause the second airflow imparting apparatus 140 to turn on, turn off, operate a particular one of a plurality of different speeds, heat air flowing therethrough, and/or the like. The humidification control device 152 receives a control signal from the apparatus control unit 172, which can cause the humidification control device 152 to turn on, turn off, deliver a particular amount of water into the air, cause a prescribed change in a humidity level of the air, and/or the like. The water conditioning apparatus 154 receives a control signal from the apparatus control unit 172, which can cause the water conditioning apparatus 154 to turn on, turn off, to cause a particular amount of heat to be delivered/removed into/from the water, to cause the water to be heated/cooled to a particular temperature, and/or the like. The delivery control device 165 of the water delivery apparatus 160 receives a control signal from the apparatus control unit 172, which can cause the delivery control device 165 to turn on, turn off, deliver a particular amount of water through the one or more water outlet devices 162, cause a prescribed change in a water vapor pressure within the building construction articles 105, and/or the like.

The sensor data unit 174 is coupled to a plurality of sensors for providing feedback information to the energy transfer controller 170. The feedback information is used by the apparatus control unit 172 for affecting (e.g., controlling) operation of the motor 136, the first airflow imparting apparatus 130, the second airflow imparting apparatus 140, the humidifying apparatus 150, the water conditioning apparatus 154, and the water delivery apparatus 160. Examples of such sensors include, but are not limited to, an ambient inlet air sensor 180, an ambient outlet air sensor 182, a dehumidified air sensor 184, a humidified inlet air sensor 186, a humidified outlet air sensor 188, and a building construction article sensor 190. Examples of feedback information capable of being provided by each one of such sensors includes, but is not limited to, temperature, relative humidity, capacitance, vapor pressure, and the like.

As disclosed above, in preferred embodiments of the present invention, each one of the building construction articles 105 provide hygroscopic heat sink mass properties demonstrated by predetermined values of electrostatic attraction to the positive ions of water (CEC, cation exchange capacity), predetermined properties of porosity determined by a wide range of porous material compositions and open porous structure formations between particles, predominantly comprising messoporous and macroporous pore sizes and predetermined distribution ratios of these pores, providing thereby a predetermined equilibrium moisture content, a high rate of water vapor transmission with a capacity for storage of thermal energy for extended periods of time Said building construction article provide a design/shape of said building construction articles to provide increased surface area exposure to climatically conditioned air streams, for the purpose of promoting an increased water vapor adsorption/desorption capacity, thereby promoting the efficient diffusion of water vapor, condensation of water vapor and the evaporation of water into/out of the building construction articles and thereby the storage and the transfer of thermal energy. Wherein said hygroscopic properties can be demonstrated by equilibrium moisture content at about 68 degrees Fahrenheit and about 50% relative humidity from about 3% to about 11% and equilibrium moisture content at about 68 degrees Fahrenheit and about 85% relative humidity from about 6% to about 23% demonstrating a water vapor adsorption isotherm type of at least one of Type III, Type IV, and Type V adsorption isotherms. To this end, building construction articles demonstrating hygroscopic properties suitable for supporting vapor pressure imbalances in accordance with the present invention comprise at least a portion of materials modified to have a cation exchange capacity from about 10 to about 120 meg/100 g thereby providing a defined electrostatic attraction to positive ions of water. Such building construction articles also have an open pore structure, a mesoporous pore structure, and a macroporous pore structure for providing hygroscopic properties having a vapor permeability characteristic of at least 10 US perms to about 100 US perms.

Compositions of the building construction articles 105 can be selected and formulated to make the building construction articles from various natural accruing and manmade materials thereby providing a predetermined value of electrostatic attraction to the positive ions of water, predetermined properties of porosity determined by pore sizes and distribution ratios thereof, variations of building construction article densities and porous structure formations of material compositions of the building construction articles for the purpose of transferring thermal energy into/out off the building construction articles through the diffusion, condensation and the evaporation of water into/out of the building construction articles. More specifically, in certain preferred embodiments of the present invention, all or a portion of each one of the building construction articles 105 exhibits hygroscopic heat sink mass properties of natural accruing and manmade materials provided by formulations of materials and mixture thereof including but not limited to, earthen soils containing particles of clay distributed therein, earthen soils stabilized with from about 1% to about 8% Portland cement, zeolite minerals, limestone, vapor permeable cut limestone, crushed limestone, expanded clay, low expansive clays, medium expansive clays, highly expansive clays, sepiolite, atapulgite, porous aluminum hydroxide materials, hydrophilic silica aerogels, messo porous silicate materials, sol-gel, hybrid adsorbents, natural adsorbents, materials having cation exchange properties, anionic minerals, diatomaceous earth, pumice, volcanic scoria, volcanic ash, desiccants, fly ash, salts, metals, crushed stone, fusion type phase change materials, manmade or modified sorption/desorption materials such as manmade zeolites, activated carbon, plant cellulose fibers, agricultural plant fibers, water absorbing hydrophilic polymers, hydrophilic plastics, manmade water absorbing fibers, sheep's wool, cotton, foamed clay composites, hydrophilic exfoliated clay, hemp, flax, wood fiber compositions, mineralized wood chips, cement bonded wood chips, mineralized organic plant materials such as rice straw and the like, mineralized recycled paper cellulose, mica, pearlite, vermiculite, gypsum, ground blast furnace slag, lignite, silica fume, sodium hydroxide, potassium hydroxide, calcium hydroxide, silica gel, silt containing soils, materials classified as pozzolans are examples of such natural accruing and manmade materials. Ground rice husk ash, rice husk, rice straw, hemp hurds, mineralized hemp hurds, calcium bonded hemp hurds, clay boards, organic humic, organic compounds, allophane clays, imogolite clays, amorphous minerals, molecular sieves, expanded slag, haydite, guerite, saugin, calcium silicate compositions/composites, manmade mineral foam, nano composites, nano-crystalline composites, light weight aerated calcium silicate building units cured in autoclave environments such as produces by Hebel and E-Crete manufactures of building blocks, hydrophilic rock wool compositions, and materials modified with ionic surfactants comprising hydrophilic properties are further examples of suitable materials for building construction articles utilized in embodiment of the present invention. Other component of building construction articles utilized in embodiment of the present invention provide properties for inhibiting fungal growth such as boron compounds, borax washing soap, boric acids, in general increasing the acidic/alkaline properties for inhibiting fungal growth, anti-fungal/antimicrobial compounds and the like.

At least one preferred binder used in making building construction articles utilized t of the present invention are generally referred to as geopolymer binders such as developed by Blue World Crete, Pompano Beach Fla. and GeoTree Technologies, Lafayette Colo., alkali activated alumino-silicate binders and include without limitations a synthetic and substantially amorphous polymer with a silico-aluminate structure. Inorganic geopolymers, organic based geopolymers, magnesium oxide cements, are some examples of preferred binders of building construction articles utilized in embodiments of the present invention. The geopolymers and other preferred binders of building construction articles utilized in embodiment of the present invention retain an insignificant amount of moisture within the geopolymers and other preferred composite binders and composite compositions and thereby provide microscopic porous formations as water is dispersed from binder compositions during the curing process. Dispersion of water from the preferred binder compositions of building construction articles provides porous structures formed thereby extending throughout the preferred binders, making them excellent composite composition binders of the vapor permeable heat sink mass comprising; water vapor sorption/desorption properties. The binder compositions are mixed with the components of the building construction articles utilized in embodiments of the present invention without preventing at least partial functionality of water vapor sorption/desorption properties of components of the building construction articles utilized in embodiments of the present invention. It is disclosed herein that clay and other components of the composite compositions have a very large array of ionic properties both positive cations and negative anions, cation exchange capacities, thereby providing multiple arrays of mixtures, formulations possibilities, thereby diversifying the cation exchange capacities of the water/water vapor desiccant sorption/desorption properties of building construction articles utilized in embodiment of the present invention, for creating compositions having preferred water molecule sorption/holding/attracting, water molecule desorption/releasing properties, thereby providing the optimal water/water vapor desiccant sorption/desorption properties of building construction articles utilized in embodiments of the present invention. Furthermore while virtually all materials exhibit desiccant type behavior, the term desiccant associated with the hygroscopic properties of the building construction articles of this present discloser is reserved for materials for which this behavior can be utilized to produce a predictable and useful results, such as the transfer of thermal energy to and from said building construction articles.

Traditional stick frame construction methods have demonstrated problems of fungal growth within the interior spaces of the building structure. Mold generally grows between the outer most surfaces of modern day building structures, due to vapor bearers that prevent moisture transmission and thereby promote condensation of water vapor within the building structure providing thereby ideal growing conditions for fungi within moist dark spaces typically found in today's modern stick constructions. When moisture condensation or infiltration develops within the cavities of the structures and when the inability to remove/evaporate the condensed moisture persists for extended periods, a perfect environment is produced for mold growth. Although the method and apparatus of the present invention relates to the intentional delivery of moisture to the interior cavities of a building structure and is disseminated into the compositions of the construction materials themselves, conditions for mold growth are greatly reduced if not entirely eliminated through providing, compositions of building construction articles, inserts, and building construction component parts of the present invention, having natural antimicrobial/antifungal properties integrated therein. Construction article compositions of the present invention also provide water vapor diffusion through the construction articles. Composition binders of the construction articles of the heat sink mass do not retain water as part of the chemical composition when cured, thereby providing construction articles, building construction component parts and material compositions that are highly porous and vapor permeable, capable of being dried to a state of very low moisture content.

FIG. 3 shows a method 200 for providing climatic conditioning of a building structure in accordance with an embodiment of the present invention. In a preferred embodiment, the method 200 is carried out using the building structure climatic conditioning system 100 discussed above in reference to FIG. 1. However, in view of the disclosures made herein, a skilled person will appreciate that the method 100 can be carried out using variants of the building structure climatic conditioning system 100 or using other suitably configured structure climatic conditioning systems.

The method 200 begins with an operation 202 for activating the dehumidification apparatus 112 for extracting water from air flowing through downstream zone Z2 of the closed-loop airflow circuit 128 (i.e., the zone between the desiccant wheel 132 and the exit 116 of the airflow passage 108 defined by the building construction articles 105). Activating the dehumidification apparatus 112 includes activating the motor 136 for causing rotation of the desiccant wheel 132, activating the first airflow imparting apparatus 130 for circulating air through the closed-loop airflow circuit 128 and activating the second airflow imparting apparatus 140 for circulating air through the ambient-loop airflow circuit 145. In this manner, moisture is transferred from air within airflow of the closed-loop airflow circuit 128 to air within airflow of the ambient-loop airflow circuit 145 via the desiccant wheel 132 thereby extracting moisture from the building construction articles 105 and shedding such moisture to the ambient environment.

Activation of the dehumidification apparatus 112 during a start-up phase of operation of the building structure climatic conditioning system 100 can be triggered by any number of conditions. One such condition is a temperature within a living spaced defined by the building construction articles 105 exceeding a threshold temperature. Another such condition is a temperature within one or more of the building construction articles 105 exceeding a threshold temperature. The present invention is not unnecessarily limited to any particular triggering event/condition for causing the activation of the dehumidification apparatus 112 during a start-up phase of operation of the building structure climatic conditioning system 100.

The operation 202 for extracting water from air flowing through downstream zone Z2 of the closed-loop airflow circuit 128 is performed until a humidity reduction condition(s) is/are met. The water content level of the air within the downstream zone Z2 of the closed-loop airflow circuit 128 having been reduced by a defined amount is one example of the humidity reduction condition being met. An equilibrium water content level in the context of the present invention refers to a water content level of the air flowing through the passage 108 of the building construction articles 105 and the water content level within the building construction articles 105 attaining a specified threshold with regard to each other. A temperature within at least one of the building construction articles 105 having been reduced by a defined amount is another example of the humidity reduction condition being met. The water content level of at least one of the building construction articles 105 having been reduced by a defined amount is another example of the humidity reduction condition being met. The dehumidifying apparatus having been in operation for a defined duration of time is another example of the humidity reduction condition being met.

In response to an operation 203 for assessing startup condition results in the determination that the humidity reduction condition is met, an operation 204 is performed for activating the humidification apparatus 150 to deliver moisture into the air within the upstream zone Z1 of the closed-loop airflow circuit 128 (i.e., the zone between the desiccant wheel 132 and the inlet 114 of the airflow passage 108 defined by the building construction articles 105). Preferably, but not necessarily, the operation 204 for delivery of moisture into the air within the upstream zone Z1 of the closed-loop airflow circuit 128 is performed concurrently with the operation 202 for activating the dehumidification apparatus 112 for extracting water from air flowing through downstream zone Z2 of the closed-loop airflow circuit 128. Advantageously, dehumidification of air flowing through the closed-loop airflow circuit 128 serves to increase the amount of moisture that can be delivered into the air of the upstream zone Z1 of the closed-loop airflow circuit 128.

The operation 204 for delivering moisture into the air within the upstream zone Z1 of the closed-loop airflow circuit 128 is performed until a humidity elevation condition(s) is/are met. The water content level of the air within the upstream zone Z1 of the closed-loop airflow circuit 128 having been increased by a defined amount is one example of the humidity elevation condition being met. A temperature within at least one of the building construction articles 105 has been increased by a defined amount is another example of the humidity elevation condition being met. A water content level of at least one of the building construction articles having been increased by a defined amount is another example of the humidity elevation condition being met. The humidity-imparting apparatus having been in operation for a defined duration of time is another example of the humidity elevation condition being met. A prescribed volume of water having been delivered into the air within the upstream zone Z1 of the closed-loop airflow circuit 128 is another example of the humidity elevation condition being met.

In response to an operation 206 for assessing humidity elevation condition results in the determination that the humidity elevation condition is not met, an operation 208 is performed for determining if direct injection of water into one or more passages of the building construction articles 105 is necessary/desirable to achieve the humidity elevation condition. For example, the rate of moisture uptake by building construction articles 105 from air within the airflow passage 108 formed by the building construction articles 105 can be inadequate for suitably achieving the humidity elevation condition. If it is determined that direct injection of water into one or more passages of the building construction articles 105 is necessary/desirable to achieve the humidity elevation condition, an operation 210 is performed for activating the water delivery apparatus 160 for causing water to be selectively delivered to and dispensed from the one or more water outlet devices 162 into the respective channel 164 of one or more of the building construction articles 105. In this manner, the humidification of the air and direct delivery of water are both used for causing the humidity elevation condition to be achieved. Alternatively, humidification of the air can be discontinued as needed/desired during direct injection of water. Otherwise, if it is determined that direct injection of water into one or more passages of the building construction articles 105 is not necessary/desirable to achieve the humidity elevation condition, the method continues at the operation 206 for determining if the humidity elevation condition has been met.

In response to an operation 206 for assessing humidity elevation condition results in the determination that the humidity elevation condition is met, an operation 212 is performed for inhibiting operation of the dehumidification apparatus 112, the humidifying apparatus 150, and the water deliver apparatus 160 (i.e., the apparatuses). Thereafter, an operation 214 is performed for assessing if a thermal energy transfer condition has been met. Examples of the thermal energy transfer condition include, but are not limited to, a prescribed period of time passing since inhibiting operation of the apparatuses, a prescribed increase in temperature of air within the closed-loop airflow circuit 128, a prescribed increase a temperature of one or more of the building construction articles 105, a prescribed increase in water vapor pressure within one or more of the building construction articles 105, and the like. If the thermal energy transfer condition has not been met, the method 200 continues with for inhibiting operation of the humidifying apparatus 150 and the water deliver apparatus 160. Otherwise, the method proceeds at the operation 202 for activating the dehumidification apparatus 112 for extracting water from air flowing through downstream zone Z2 of the closed-loop airflow circuit 128. In this manner, such activation and deactivation of the humidifying apparatus 150 and/or the water deliver apparatus 160 causing alternating vapor pressure imbalances between the air within the airflow passage 108 and the building construction articles 105 thereby promoting phase change of water and movement of water into and out of the building construction articles 105 to at least one of dissipate thermal energy therefrom and provide thermal energy thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A climatic conditioning system, comprising:
    a plurality of heat sink mass building construction articles configured to form a portion of a building structure, wherein multiple water vapor phase change cycles are generated through artificially creating climatic conditions within said heat sink mass for promoting water vapor phase change cycles and the transfer of thermal energy at least one of into and out of the heat sink mass of the building construction articles, wherein said building construction articles are arranged relative to each other to form an airflow passage extending through the portion of the building structure, and wherein a surface of each one of said building construction articles defines a respective portion of the airflow passage formed by said building construction articles;
    an airflow imparting apparatus having an airflow outlet passage thereof coupled to the airflow passage formed by said building construction articles such that the airflow outlet passage and the airflow passage formed by said building construction articles jointly define at least a portion of a closed-loop airflow circuit, wherein the airflow imparting apparatus provides a volume of thermally conditioned, moisture conditioned airflow through the airflow passage formed by said building construction articles;
    an energy transfer controller including an apparatus control unit and a sensor data unit, wherein the energy transfer controller is configured to manage operation of a humidifying apparatus and a dehumidifying apparatus, enabling implementation of climatic control for causing alternating vapor pressure imbalances between said building construction articles and a first thermally conditioned, relatively moist climatically conditioned air stream and then a second thermally conditioned, relatively dry climatically conditioned air stream circulating through the airflow passage formed by said building construction articles thereby promoting phase change and movement of water into and out of said building construction articles to at least one of dissipate thermal energy therefrom and provide thermal energy thereto.

2. The system of claim 1 wherein said multiple water vapor phase change cycles being generated through artificially creating climatic conditions includes facilitating diffusion of water vapor into and out of said building construction articles, the movement of liquid water into said building construction articles by capillary suction for the purpose of at least one of sensible climatic conditioning and latent climatic conditioning of the heat sink mass of the building construction articles to at least one of a cooler and a warmer sensible temperature.

3. The system of claim 1 wherein said multiple water vapor phase change cycles being generated through artificially creating climatic conditions includes facilitating condensation of water vapor within said building construction articles, evaporation of condensed water from said building construction articles for the purpose of at least one of sensible climatic conditioning and latent climatic conditioning of the heat sink mass of the building construction articles to at least one of a cooler a warmer sensible temperature.

4. The system of claim 1 wherein each one of said building construction articles comprises at least one of intraparticle open pore structures, micro porous pore structure, meso porous pore structures, and macro porous pore structures for providing hygroscopic properties having a vapor permeability characteristic of at least 10 US perms.

5. The system of claim 1 wherein: at least one of sensible heat and latent heat is one of added to and extracted from said airflow prior to said airflow entering the airflow passage formed by said building construction articles, wherein said at least one of sensible heat and latent heat is provided naturally from outside ambient air, wherein an outside ambient air forms at least a portion of said closed-loop airflow circuit.

6. The system of claim 1 wherein:
a first surface of each one of said building construction articles is directly exposed to alternating climatically conditioned air streams within the airflow passage formed by said building construction articles;
the first surface has at least one of a design and a shape for increased surface area exposed to said alternating climatically conditioned air streams;
the first surface is defined by a portion of a respective one of said building construction articles;
the portion of the respective one of said building construction articles defining the first surface demonstrates and provides hygroscopic properties and functionality; and
said hygroscopic properties and functionality jointly facilitate diffusion of water vapor into and out of said building construction articles, condensation of water vapor within said building construction articles, the movement of liquid water into said construction articles by capillary suction and the evaporation of condensed water from said construction articles for the purpose of at least one of sensible climatic conditioning and latent climatic conditioning of the heat sink mass of the building construction articles to at least one of a cooler and a warmer sensible temperature.

7. The system of claim 6 wherein increased surface area exposure of said building construction articles to said alternating climatically conditioned airstreams within the airflow passages formed by said building construction articles promotes diffusion of water vapor, condensation of water vapor, increased water vapor uptake and water vapor evaporation capacities for the purpose of increasing the thermal energy transfer capacity to and from the building construction articles.

8. The system of claim 6 wherein:
a second surface of each one of said building construction articles is adjacent to a living space of the building structure;
the portion of the respective one of said building construction articles defining the second surface demonstrates said hygroscopic properties;
the first surface and the second surface are coupled to each other through a portion of the respective one of said building construction articles that and provides said hygroscopic properties and functionality; and
said hygroscopic properties and functionality jointly facilitate diffusion of water vapor into and out of said building construction articles, condensation of water vapor within said building construction articles, the movement of liquid water into said construction articles by capillary suction and the evaporation of condensed water from said construction articles for the purpose of at least one of sensible climatic conditioning and latent climatic conditioning of the heat sink mass of the building construction articles to at least one of a cooler and a warmer sensible temperature.

9. The system of claim 8 wherein each one of said building construction articles comprises at least one of intraparticle open pore structures, microporous pore structure, mesoporous pore structures, and macroporous pore structures for providing said hygroscopic properties having a vapor permeability characteristic of at least 10 US perms.

10. The system of claim 1 wherein enabling implementation of climatic control for causing alternating vapor pressure imbalances between alternating climatically conditioned air streams within said airflow passage formed by said building construction articles includes causing a humidity level within said airflow passage formed by said building construction articles at ambient temperatures, to be decreased until a defined humidity reduction condition is met and a defined equilibrium moisture content of said building construction articles is met and then causing the humidity level within said airflow passage formed by said building construction articles to be increased until a defined humidity elevation condition is met and a defined equilibrium moisture content of said building construction articles is met.

11. The system of claim 10 wherein causing the humidity level within said air passage formed by said building construction articles to be decreased includes operating the dehumidifying apparatus until the humidity-reduction condition is met and then simultaneously operating the dehumidifying apparatus and the humidifying apparatus until the humidity-elevation condition is met.

12. The system of claim 10 wherein:
the humidity-reduction condition is met when at least one of the water content level of said airflow has been reduced by a defined amount, a temperature within at least one of said building construction articles has been reduced by a defined amount, a water content level of at least one of said building construction articles has been reduced by a defined amount, and the dehumidifying apparatus has been in operation for a defined duration of time; and
the humidity-elevation condition is met when at least one of the water content level of said airflow has been increased by a defined amount, a temperature within at least one of said building construction articles has been increased by a defined amount, a water content level of at least one of said building construction articles has been increased by a defined amount, the humidity-imparting apparatus has been in operation for a defined duration of time, and a prescribed volume of water has been delivered into said airflow.

13. The system of claim 1, further comprising:
a water conditioning apparatus coupled to the humidifying apparatus, wherein the water conditioning apparatus provides thermally-conditioned water to the humidifying apparatus for enabling the water conditioning apparatus to selectively control temperature of water to said airflow either prior to or after introduction of said water into said airflow.

14. The system of claim 13 wherein enabling implementation of climatic control for causing alternating vapor pressure imbalances between alternating climatically conditioned air streams within said airflow passage formed by said building construction articles includes causing a humidity level within said airflow passage formed by said building construction articles at ambient temperatures, to be decreased until a defined humidity reduction condition is met and a defined equilibrium moisture content of said building construction articles is met and then causing the humidity level within said airflow passage formed by said building construction articles to be increased until a defined humidity elevation condition is met and a defined equilibrium moisture content of said building construction articles is met.

15. The system of claim 1, further comprising:
a water delivery apparatus having a water outlet portion thereof exposed within a water receiving passage of at least one of said building construction articles for enabling water to be delivered from the water delivery apparatus into the water receiving passage.

16. The system of claim 1 wherein said vapor pressure imbalance is altered by at least one of increasing atmospheric pressure within air passages of the heat sink mass of the building construction articles or decreasing atmospheric pressure within air passages of the heat sink mass of the building construction articles, exposing said building construction articles to alternating climatically conditioned air streams.

17. The system of claim 1 wherein: an exterior ambient side surface of said construction articles configured to form a building structure comprise the addition of at least one of thermal retarders and vapor barriers for enhancing the efficiency of said climatic conditioning system.

18. The system of claim 1 wherein each one of said building construction articles is formulated and made to demonstrate hygroscopic and heat sink mass properties comprising:
building construction component parts, articles, inserts, units, panels, sheets, blocks, coatings, insulation and the like of said building structure, having formulated compositions comprising physical properties for facilitating at least one of water vapor sorption into said building construction articles and water vapor desorption out of said building construction articles; and
components of composites, composite formulations, and binder compositions of said building construction articles, are selected, formulated and physically formed into a multiplicity of densities, shapes, designs, textures, having porosity characteristics, cation exchange capacities providing an electrostatic attraction to positive ions of water and at least one of water vapor sorption into the heat sink mass of the building construction articles and water vapor desorption out of the heat sink mass of the building construction articles.

19. The system of claim 18 wherein each one of said building construction articles includes a compound formulated to exhibit at least one of antifungal properties and antimicrobial properties.

* * * * *